(12) United States Patent
Laible

(10) Patent No.: US 8,066,157 B2
(45) Date of Patent: *Nov. 29, 2011

(54) DISPENSING AND/OR DOSING SYSTEM INCLUDING AN IMPROVED THROAT PLUG ASSEMBLY

(76) Inventor: Rodney Laible, Omaha, NE (US)

( * ) Notice: Subject to any disclaimer, the term of this patent is extended or adjusted under 35 U.S.C. 154(b) by 117 days.

This patent is subject to a terminal disclaimer.

(21) Appl. No.: 12/378,850

(22) Filed: Feb. 20, 2009

(65) Prior Publication Data

US 2009/0159618 A1 Jun. 25, 2009

Related U.S. Application Data

(63) Continuation-in-part of application No. 11/879,163, filed on Jul. 16, 2007.

(51) Int. Cl.
*G01F 11/28* (2006.01)
(52) U.S. Cl. ........ 222/453; 222/442; 222/448; 222/449; 222/450; 222/451
(58) Field of Classification Search .................. 222/442, 222/448, 449–451, 453, 436, 425, 476, 518; 141/353, 362, 295, 354, 351
See application file for complete search history.

(56) References Cited

U.S. PATENT DOCUMENTS

| | | | | |
|---|---|---|---|---|
| 3,123,107 | A * | 3/1964 | Kappler | 141/352 |
| 3,658,216 | A * | 4/1972 | Schwartzman | 222/453 |
| 3,705,668 | A * | 12/1972 | Schwartzman | 222/207 |
| 5,097,991 | A * | 3/1992 | Lance | 222/442 |
| 5,526,961 | A * | 6/1996 | Burrows | 222/185.1 |
| 5,555,743 | A * | 9/1996 | Hatanaka | 62/347 |
| 6,142,345 | A | 11/2000 | Laible | |
| 6,923,345 | B1 | 8/2005 | Laible | |
| 6,945,432 | B2 | 9/2005 | Laible | |
| 6,945,433 | B2 | 9/2005 | Laible | |
| 6,986,443 | B2 | 1/2006 | Laible | |
| 7,614,528 | B2 * | 11/2009 | Jeong | 222/438 |
| 2004/0206786 | A1 * | 10/2004 | Laible | 222/507 |
| 2005/0263547 | A1 * | 12/2005 | Jensen et al. | 222/504 |

* cited by examiner

*Primary Examiner* — Kevin P Shaver
*Assistant Examiner* — Robert Nichols, II
(74) *Attorney, Agent, or Firm* — Dennis L. Thomte; Thomte Patent Law Office LLC

(57) ABSTRACT

A dosing and/or dispensing system for use with a liquid container such as a bottle or the like for dosing and/or dispensing liquid contents from the bottle. The system includes an improved venting to ensure that the liquid being dosed or dispensed properly and accurately drains. A novel throat plug assembly is provided for insertion into the throat of the bottle. The throat plug assembly is comprised entirely of a recyclable plastic material.

4 Claims, 11 Drawing Sheets

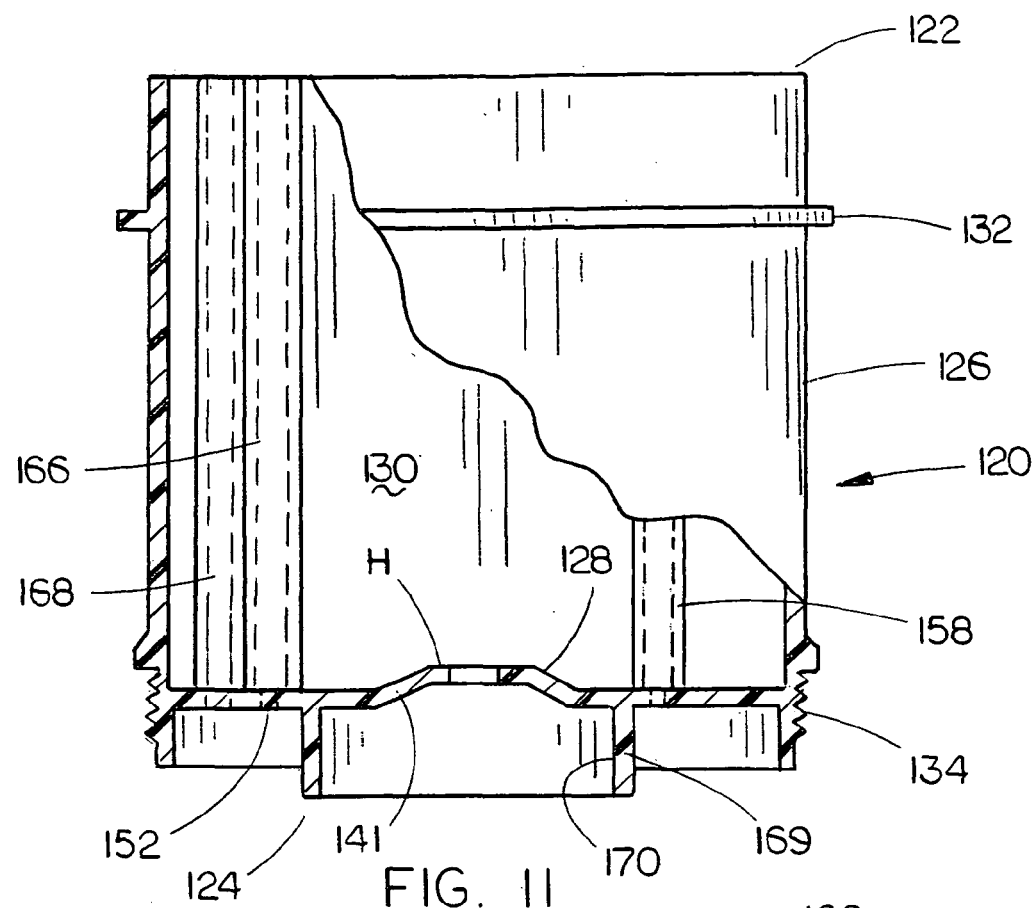
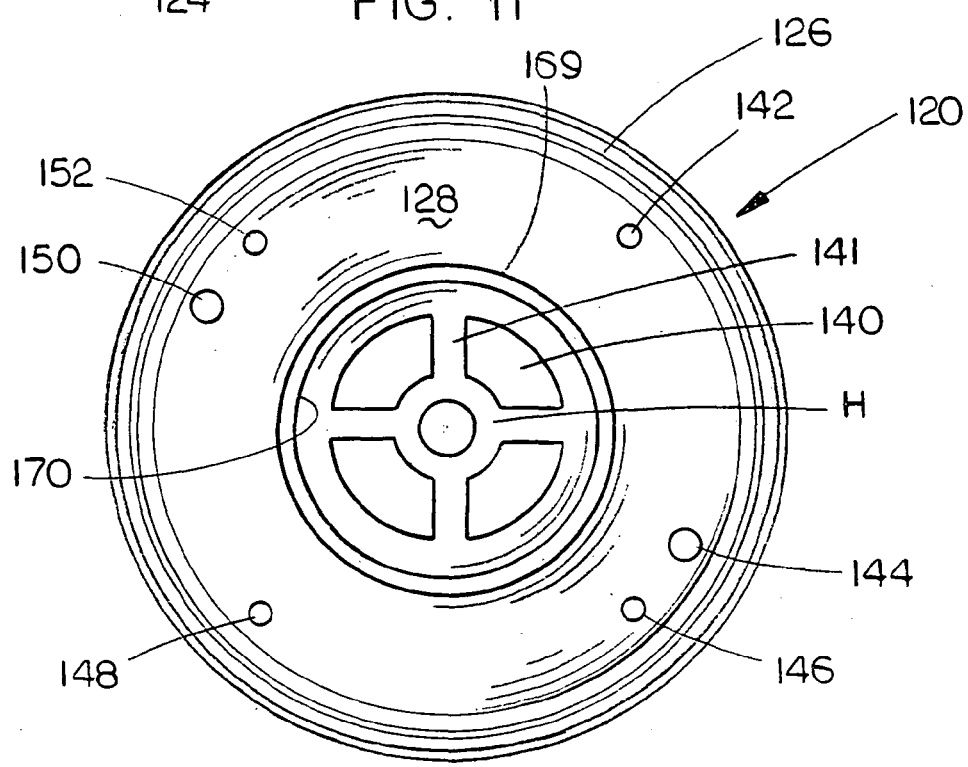

DISPENSING AND/OR DOSING SYSTEM INCLUDING AN IMPROVED THROAT PLUG ASSEMBLY

CROSS REFERENCE TO RELATED APPLICATION

This is a continuation-in-part application of the application Ser. No. 11/879,163 filed Jul. 16, 2007 entitled DISPENSING AND/OR DOSING SYSTEM.

BACKGROUND OF THE INVENTION

1. Field of the Invention

The inventions disclosed in Applicant's earlier U.S. Pat. Nos. 6,142,345, 6,986,443; 6,945,433; and 6,945,432 and the co-pending application relate to dosing and/or dispensing systems. The instant invention relates to an improved throat plug assembly for use in dispensing and/or dosing systems. More particularly, the improved throat plug assembly of the invention utilizes a plastic spring rather than a metal spring. In the preferred embodiment, the plastic spring is molded with the retainer or the throat plug assembly thereby enabling the entire throat plug assembly to be comprised of a recyclable plastic material and which also reduces the number of component parts of the throat plug assembly thereby further enhancing the assembly of the throat plug assembly.

2. Description of the Related Art

In Applicant's earlier U.S. patents, which are identified hereinabove, dosing and/or dispensing systems are disclosed for use with a liquid container such as a bottle or the like for dosing and/or dispensing liquid contents from the bottle. Various different dosing and/or dispensing embodiments are disclosed in Applicant's earlier patents which enable the liquid to be dosed or dispensed by gravity from the container. In Applicant's earlier patents, an inverted liquid container such as a bottle or the like is screwed onto a fixture which is in communication with the open upper end of a hollow cup or bowl which normally has a predetermined volume. It is desirable to dose a predetermined volume or amount of liquid from the container into a spray bottle or the like which will be used to spray a mixture of water and the liquid chemical onto surfaces to be cleaned. Although Applicant's earlier inventions work extremely well, the invention of the co-pending application represented a further advance in the art due to the unique venting of the components of the assembly so that air locks are prevented and so that the liquid will freely flow therefrom in precise amounts. In Applicant's earlier throat plug assemblies, which were an important part in the dispensing and/or dosing systems, a metal spring was utilized to yieldably maintain the valve in the throat plug assembly in a closed position with a separate cap or retainer holding the metal spring in position. An ecological problem exists with the use of a metal spring in an otherwise completely recyclable plastic throat plug assembly since the metal spring must be removed from the throat plug assembly which is being discarded to enable the other plastic components of the throat plug assembly to be recycled. In many cases, the discarded throat plug assemblies were simply thrown into the trash due to the cost of removing the metal spring from the throat plug assembly. Further, in Applicant's earlier throat plug assemblies, the metal spring and the retainer thereof were separate pieces or parts thereby requiring separate manufacture and separate assembly into the throat plug assembly.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

This invention relates to a dosing and/or dispensing system for use with an inverted liquid container such as a bottle or the like having upper and lower ends. The lower end of the container has a hollow throat extending downwardly therefrom which has interior and exterior surfaces with the exterior surface of the throat being threaded. A plastic throat plug assembly is inserted into the throat of the bottle to close the same. The throat plug assembly includes a first valve seat and a normally closed first valve which is moveable between a lower closed position to an upper open position with respect to the first valve seat. The first valve in the throat plug assembly prevents liquid from passing downwardly from the container through the first valve seat in the throat plug assembly when in its lower closed position. The first valve in the throat plug assembly permits liquid to pass downwardly from the container through the first valve seat in the throat plug assembly when in its upper open position. In the instant invention, the spring which yieldably urges the normally closed first valve to its closed position is comprised of a recyclable plastic material and is preferably molded as a unitary piece or part with the retainer of the throat plug assembly.

The system also includes a mounting ring member having upper and lower ends. The mounting ring member has first and second upstanding ring-shaped walls formed therein which have upper and lower ends and which have a bottom wall extending therebetween at the lower ends thereof to define a first channel. The bottom wall of the ring member has a plurality of vent openings formed therein. The inner face of the first wall has threads thereon which are adapted to threadably receive the throat of the container. The ring member also has a central opening formed therein inwardly of the inner face of the first wall. A ring-shaped cap is positioned on the ring member and extends over the upper ends of the first and second walls to close the upper end of the first channel. The cap is constructed of a plastic material which permits a small amount of air to pass therethrough while preventing the passage of liquid therethrough. The ring-shaped cap has a central opening formed therein which registers with the central opening in the ring member.

A hollow, generally cylindrical-shaped accumulator having an open upper end and a bottom wall with the open upper end and the bottom wall defining a liquid compartment therein. The bottom wall of the accumulator has a central opening formed therein which has an annular second valve seat positioned outwardly thereof which extends therearound. The bottom wall of the accumulator has a plurality of vent openings formed therein outwardly of the second valve seat which communicate with the liquid compartment. At least some of the vent openings in the bottom wall of the accumulator have a hollow vent tube in communication therewith which extend upwardly within the liquid compartment of the accumulator. The upper ends of the vent tubes communicate with at least some of the vent openings in the bottom wall of the first channel of the mounting ring member.

A dosing bowl or cup is also provided and has a dosing compartment formed therein. The upper end of the dosing bowl is secured to the lower end of the accumulator so that the dosing compartment is in communication with the central opening in the accumulator and the vent openings in the bottom wall of the accumulator. The lower end of the dosing bowl has a discharge opening and a third valve seat extending therearound. A dispensing actuator is selectively vertically moveably mounted on the lower end of the dosing bowl which is moveable between upper and lower positions with respect thereto. The actuator has an actuator rod secured thereto for movement therewith which extends upwardly therefrom through the dosing bowl, the central opening in the bottom wall of the accumulator, the central opening in the mounting ring member for selective engagement with the first valve in the throat plug assembly. The actuator rod causes the first valve to open when the actuator is moved to its upper position. The actuator rod has second and third vertically spaced valves mounted thereon for movement with the actuator. The second valve closes the second valve seat when the actuator is in its upper position and opens the second valve when the actuator is in its lower position. The third valve closes the third valve seat when the actuator is in its lower position and opens the third valve when the actuator is in its upper position.

The first and second valves are vertically spaced on the actuator rod so that the second valve seat is closed before the third valve seat is open as the actuator rod is moved from its lower position to its upper position and so that the third valve seat is closed before the second valve seat is opened as the actuator rod is moved from its upper position to its lower position.

It is therefore a principal object of the invention to provide an improved dosing and/or dispensing system.

A further object of the invention is to provide an improved throat plug assembly for use with dosing and/or dispensing systems.

Yet another object of the invention is to provide a throat plug assembly for use with dosing and/or dispensing systems which is comprised entirely of a recyclable plastic material.

Still another object of the invention is to provide a throat plug assembly wherein the spring for the first valve thereof is comprised of a recyclable plastic material.

Still another object of the invention is to provide a throat plug assembly wherein the valve spring and the assembly retainer are molded together to form a unitary member which is comprised of a recyclable plastic material.

Yet another object of the invention is to provide an improved dosing and/or dispensing system which includes improved venting means to ensure efficient and accurate dispensing or dosing of liquid from an inverted container.

These and other objects will be obvious to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 10 is a bottom view of the accumulator;

FIG. 11 is a side view of the accumulator with a portion thereof cut away to more fully illustrate the accumulator;

DETAILED DESCRIPTION OF THE INVENTION

Figure 1:
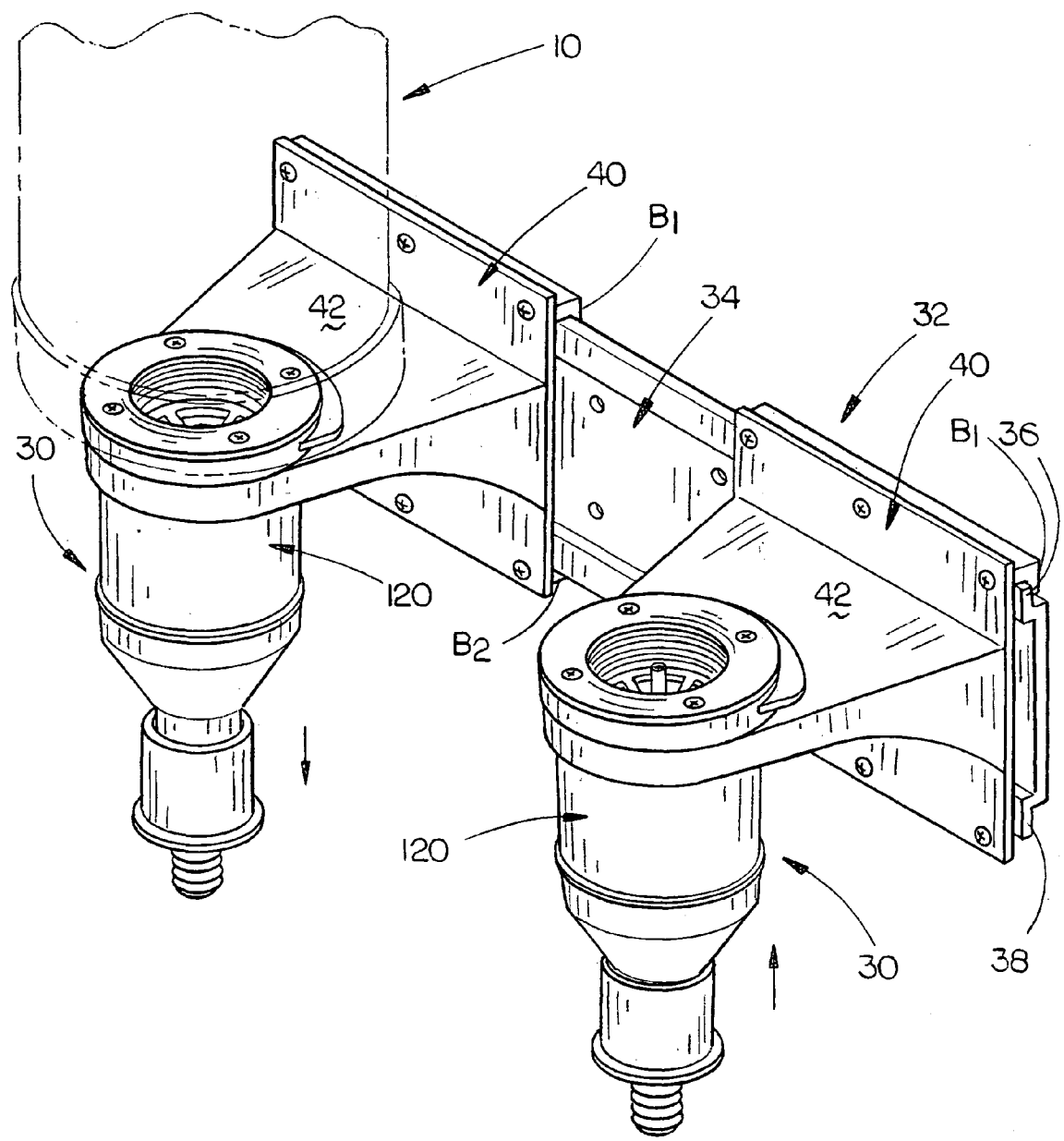
FIG. 1 is a perspective view illustrating a pair of the dispensing and/or dosing devices of the invention.
Figure 2:
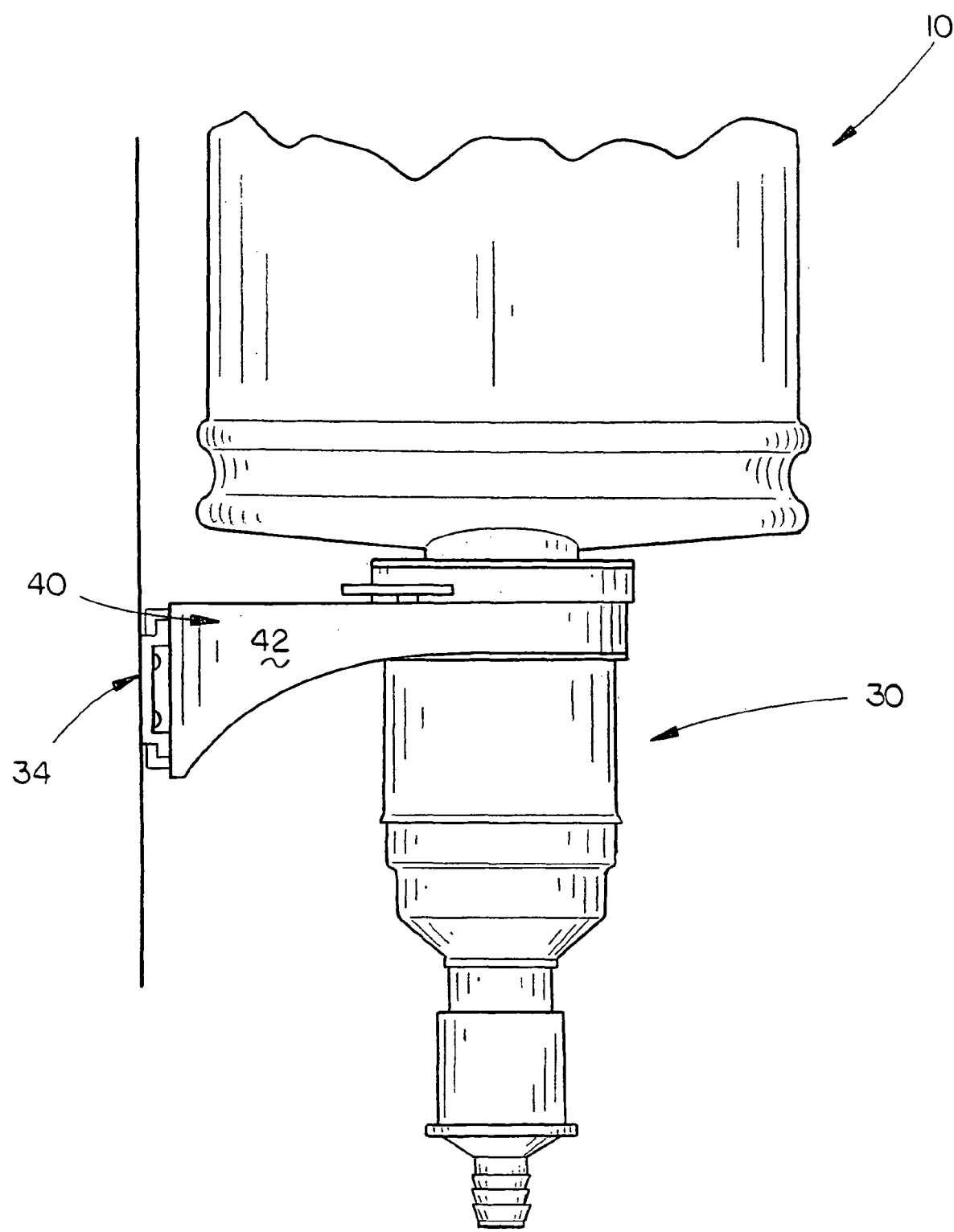
FIG. 2 is a side view of the dispensing and/or dosing device of the invention.
Figure 3:
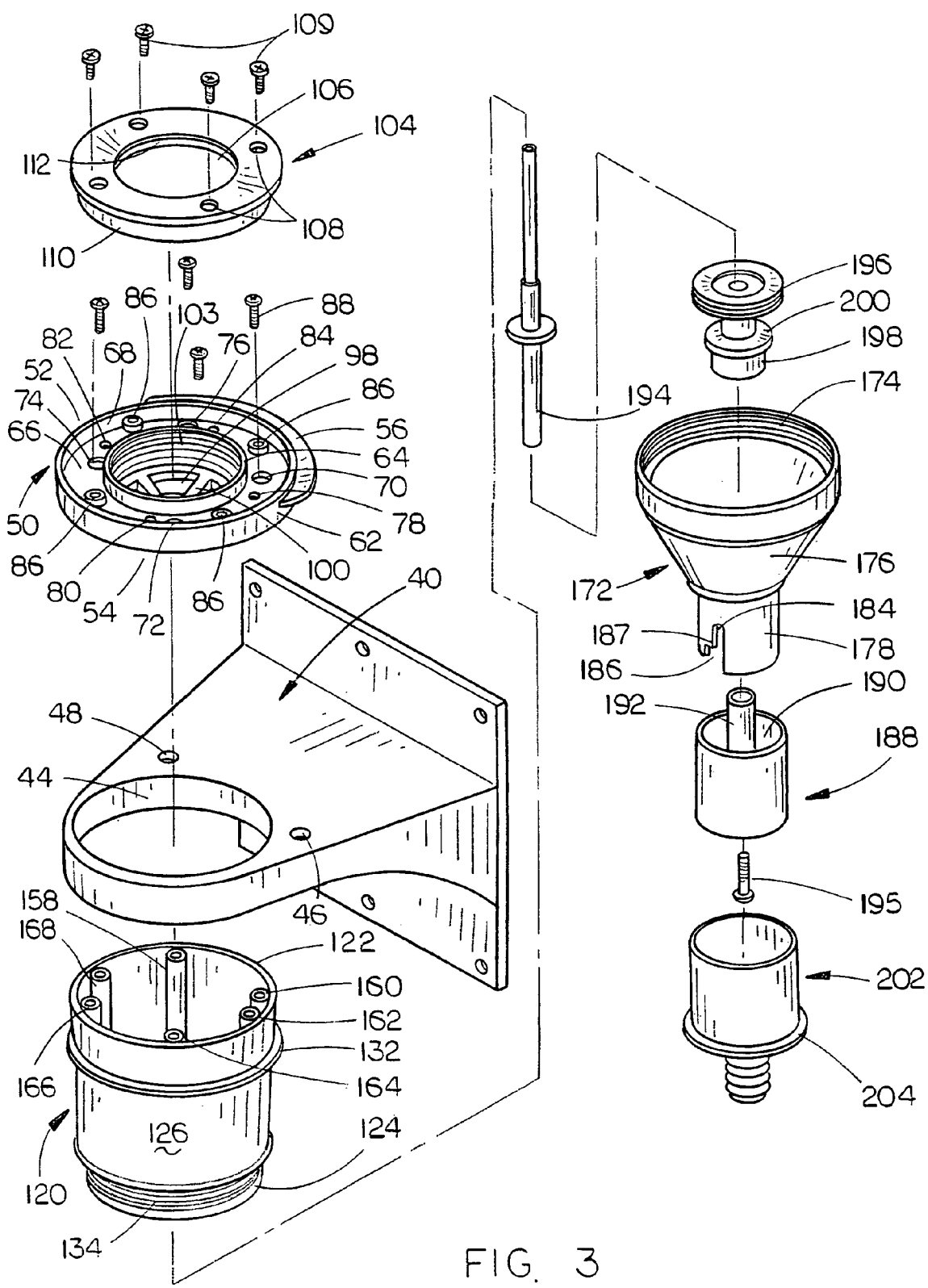
FIG. 3 is an exploded perspective view of the device of the invention.
Figures 4, 5:
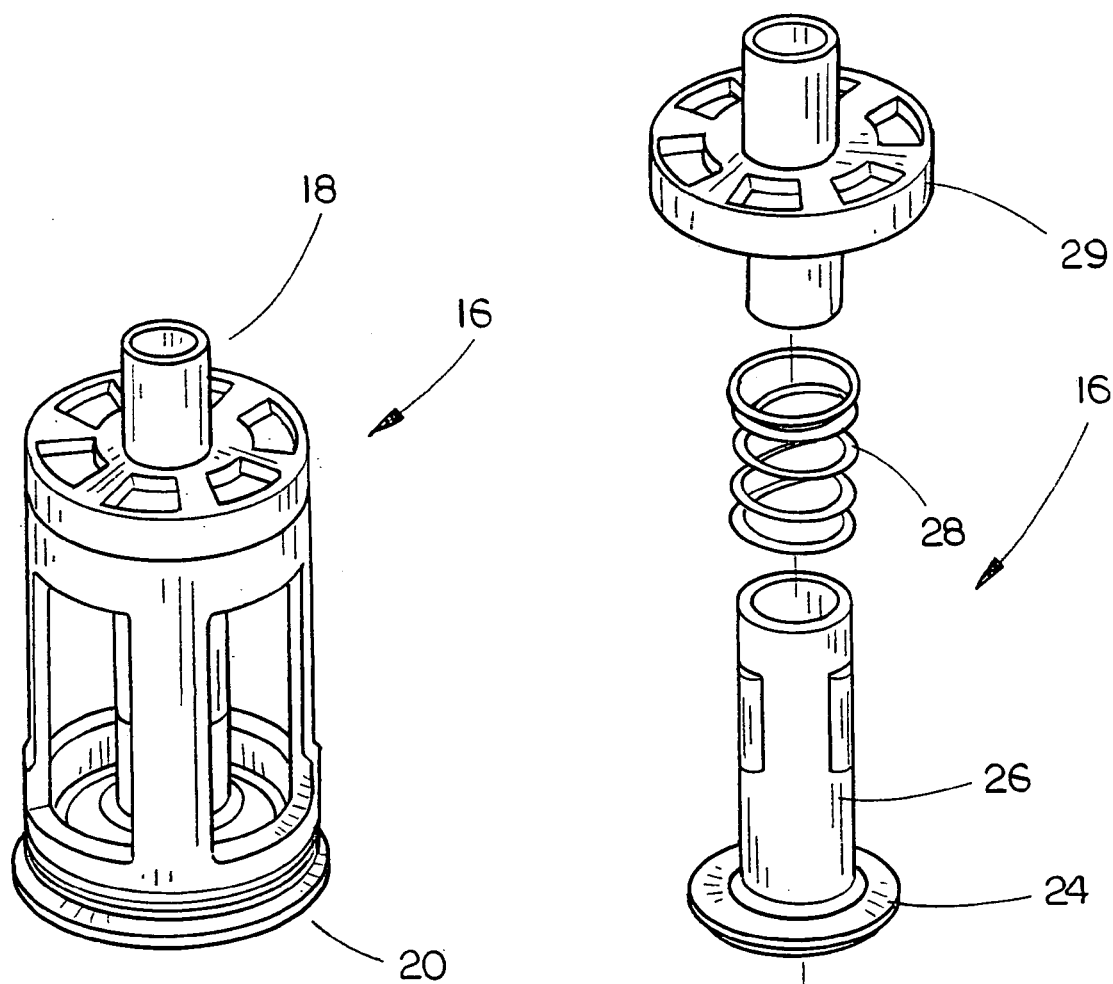
FIG. 4 is a perspective view of the throat plus assembly of the system of the invention.
FIG. 5 is an exploded perspective view of the throat plug assembly of FIG. 4.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

With respect to FIGS. 1-13, the numeral 10 refers to a conventional container such as a bottle or the like which is used for transporting, storing and dispensing liquids therefrom. The drawings illustrate the bottle 10 in an inverted dispensing position. Container 10 includes a hollow throat portion 12 which has external threads 14 and internal threads 15 provided thereon.

The numeral 16 refers to a throat plug assembly or gravity flow insert which will be described as it is positioned when the bottle 10 is in the inverted position. The throat plug assembly 16 is inserted into the hollow throat portion 12 of the bottle 10 when the bottle 10 is in its upright position. For purposes of description, throat plug assembly 16 will be described as including an upper end 18 and a lower end 20. The throat plug assembly 16 of FIGS. 1-13 is of the type previously patented by Applicant and includes a valve seat 22 thereon which is adapted to receive a valve 24 provided on valve stem 26. Valve 24 is normally closed and is yieldably urged to its closed position by a metal spring 28. The throat plug assembly 16 also includes a retainer 29 which is screwed onto the throat plug 16.

Applicant's improved dosing and/or dispensing system described in the co-pending application will now be described and will be referred to generally by the reference numeral 30. Although the assembly 30 may be attached to a mounting fixture by any of several different ways, one way of attaching the assembly to a fixture will be illustrated in the drawings and described herein.

The numeral 32 refers generally to the mounting fixture which includes a horizontally disposed mounting plate 34 which is screwed to a wall, cabinet, or other supporting surface and which has offset tracks or rails 36 and 38 provided at the upper and lower ends thereof respectively.

The numeral 40 refers to a mounting bracket which is selectively slidably mounted on the mounting plate 34 by brackets B1 and B2 and which has a shelf member 42 extending therefrom which has a circular opening 44 formed therein as well as a pair of smaller openings 46 and 48 formed therein. The mounting fixture is conventional in design.

The numeral 50 refers to a mounting ring having an upper end 52 and a lower end 54. Flange 56 extends rearwardly from ring 50 which has a pair of pegs or posts 58 and 60 extending downwardly therefrom which are received by openings 46 and 48 respectively when ring 50 is in position on bracket 40. The upper end 52 of ring 50 has a pair of upstanding, spaced-apart ring-shaped walls 62 and 64 which have a bottom wall 66 extending therebetween to define a generally U-shaped channel 68. Bottom wall 68 preferably has 4 larger openings 70, 72, 74 and 76 which extend therethrough. Wall 68 preferably has 4 smaller openings 78, 80, 82 and 84 formed therein which extend therethrough. Bottom 68 also has four hollow screw posts 86 extending upwardly therefrom adapted to receive screws 88 therein as will be described hereinafter.

The underside of ring 50 (FIG. 9) is provided with an annular recess 90 which extends upwardly therein to. The underside of ring 50 is also provided with an annular wall 92 which extends downwardly therefrom inwardly of recess 90. The underside of ring 50 further has a cylindrical body portion 94 extending downwardly therefrom to define an inverted, generally U-shaped channel 96 which communicates with the lower ends of openings 70, 72, 74, 76, 78, 80, 82 and 84. Body portion 94 has a central opening 98 having spokes 100 extending therein. Opening 102 is provided at the inner ends of the spokes 100. Body portion 94 also has internal threads 103.

Figure 6:
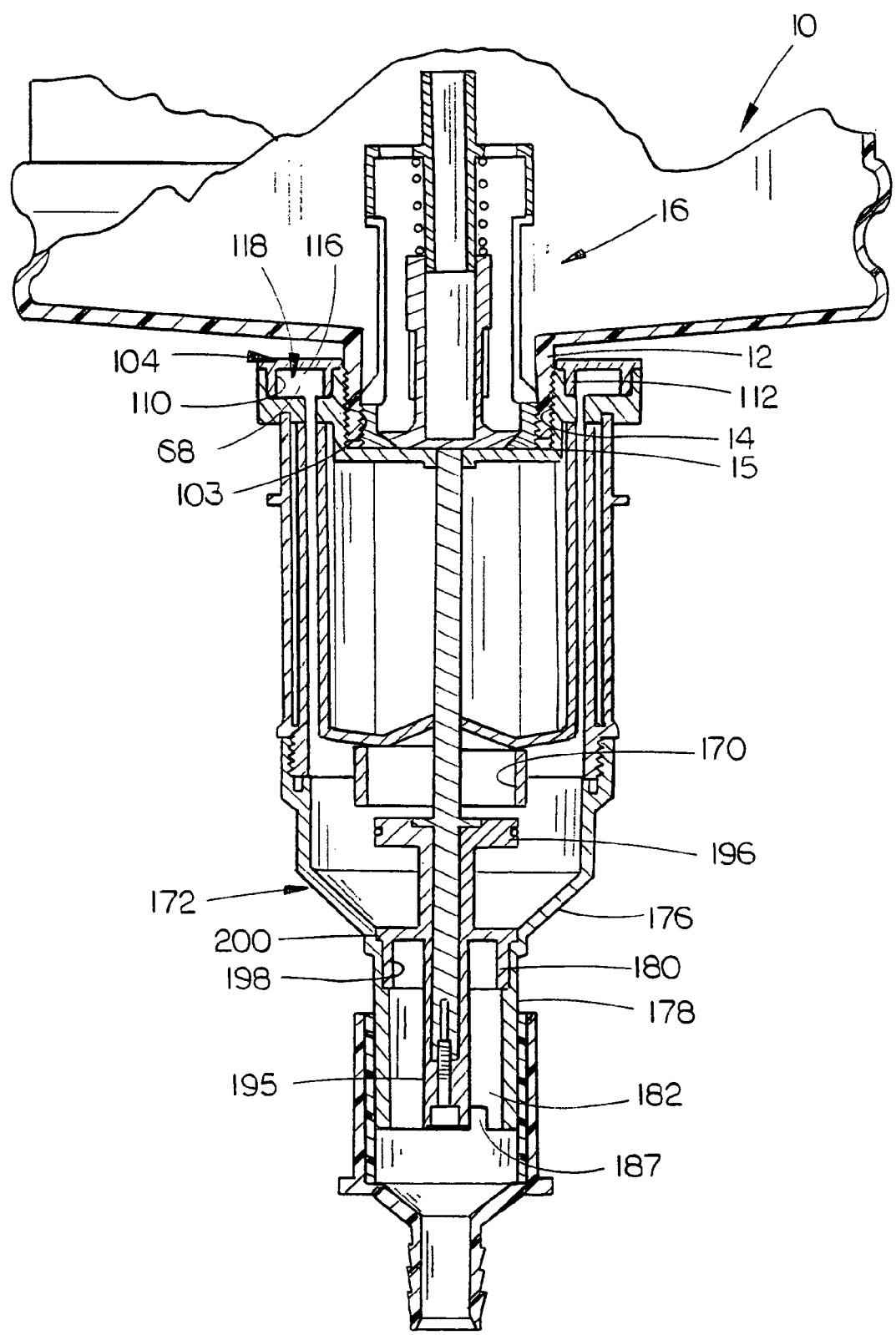
FIG. 6 is a vertical sectional view of the system of the invention wherein the throat plug assembly is in its closed position.

The upper end of ring 50 is selectively closed by a ring-shaped cap 104 having a central opening 106 and 4 screw holes 108 which register with the posts 86 so that cap 104 may be attached to ring 50 by the screws 109. The underside of cap 104 has a pair of annular walls 110 and 112 extending downwardly therefrom which are adapted to engage the inside surfaces of walls 62 and 64 of ring 50 respectively. The walls 110 and 112 define a channel 116 which registers with the channel 68 to form an annular channel designated generally by the reference numeral 118 (FIG. 6).

The numeral 120 designates a cup-shaped or cylindrical-shaped accumulator 120 having an upper end 122 and a lower end 124. Accumulator 120 includes an outer wall member 126 having a bottom wall 128 extending therebetween above the lower end to define an interior compartment 130. The exterior surface of outer wall 126 has an annular shoulder or ring 132 extending therefrom below the upper end thereof. The lower exterior of wall 126 is provided with threads 134. Bottom wall 128 has a central opening 140 formed therein. A plurality of spokes 141 extend across opening 140 and have a hub H at their inner ends which slidably receives an actuator rod as will be described hereinafter. Bottom wall 128 has openings 142, 144, 146, 148, 150 and 152 extending therefrom which communicate with hollow tubes 158, 162, 160, 164, 168 and 166 respectively which extend upwardly from bottom wall 128 in the interior compartment 166 of accumulator 120. The upper ends of tubes 158, 160, 164, and 166 are adapted to receive screws 88 which extend downwardly through the openings 70, 72, 74 and 76 in ring 50 respectively to secure accumulator 120 to ring 50. Tubes 158, 160, 164 and 166 do not serve as vent tubes but are merely mounting tubes for receiving screws 88. Tubes 162 and 168 communicate with openings 144 and 150 respectively and serve as vent tubes as will be described hereinafter. An annular wall 169 extends downwardly from bottom wall 128, the interior of which is in communication with opening 140 and which forms a valve seat 170.

Figure 7:
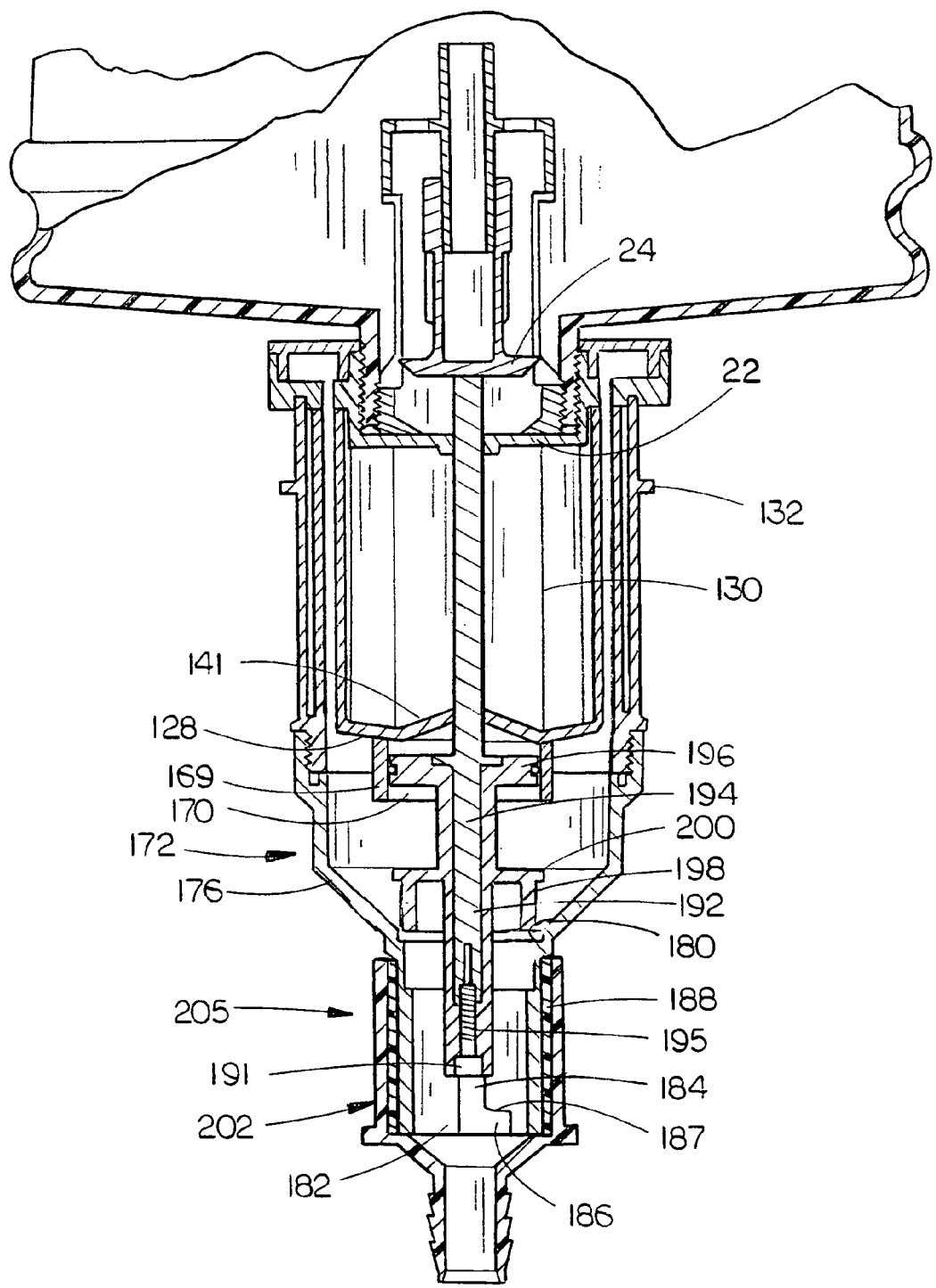
FIG. 7 is a vertical sectional view of the system of this invention when the throat plug assembly is in its open position.

The assembly also includes a dosing or dispensing cup or bowl 172 having an internally threaded upper end portion 174 which is threadably secured to the threaded portion 134 of accumulator 120. Bowl 172 includes a conical-shaped portion 176 which extends downwardly and inwardly from upper end portion 174 to a tubular portion 178, the upper interior end of which defines a valve seat 180 (FIG. 7). The lower end of tubular portion 178 is open to form a discharge opening 182.

The lower end of tubular portion 178 has a vertically disposed slot 184 and a notch 186 defining a shoulder 187 formed therein on the opposite sides of tubular portion 178. An actuator sleeve 188 is vertically movably mounted on the tubular portion 178 and has a central opening 190 which slidably and rotatably receives tubular portion 178. A vertically disposable actuator rod support 192 is positioned in opening 190 and is supported by a pair of horizontally extending spokes 191 at the lower end thereof and has an open upper end which receives the lower end of an actuator rod 194 extending upwardly therefrom. Bolt or screw 195 secures the lower end of actuator rod 194 to support 192. The slots 184 and the notches 186 are adapted to receive a spoke 191 thereon.

Figure 9:
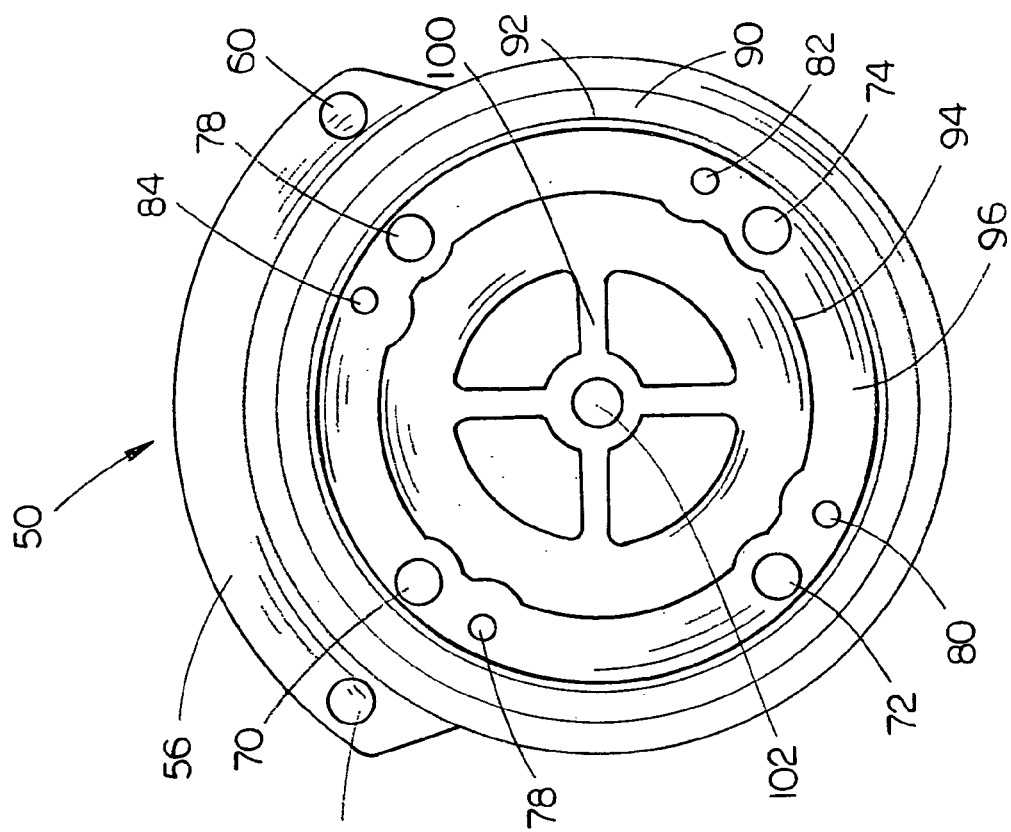
FIG. 9 is a bottom view of the mounting ring.
Figure 8:
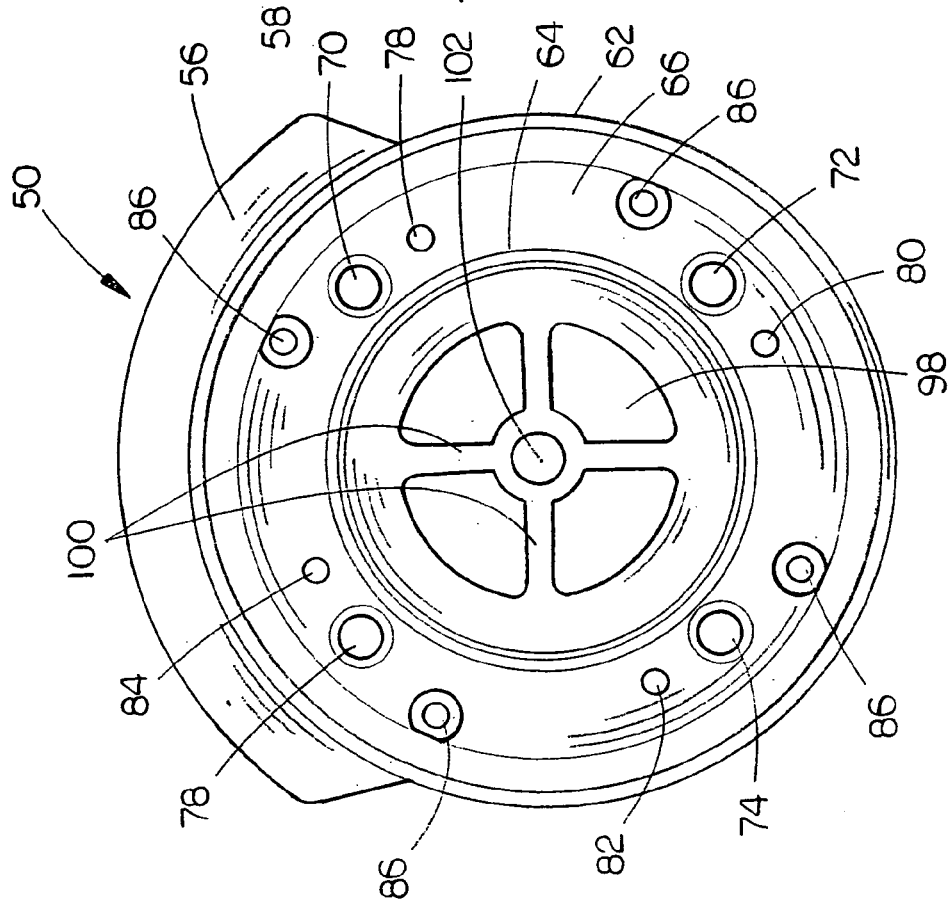
FIG. 8 is a top view of the mounting ring.

Actuator rod 194 has a disc-shaped valve 196 mounted thereon above its lower end for movement therewith. A cylindrical valve 198 is mounted on rod 194 below valve 196 and has an outwardly extending flange 200 at its upper end. Valve 196 is adapted to be received in valve seat 170 when the actuator rod 194 is in its upper position (FIG. 9). When actuator rod 194 is in its upper position, valve 198 is positioned above valve seat 180 (FIG. 7). When actuator rod 194 is in its lower position, valve 198 is received within valve seat 180 and valve 196 is positioned below valve seat 170 (FIG. 6).

The numeral 202 refers to an actuator collar which is press fitted onto the actuator sleeve 188 so as to be held in place thereon and movable therewith. Sleeve 202 has an annular knob portion 204 extending therearound. Collar 202 is tubular so as to permit liquid to flow therethrough. Sleeve 188 and collar 202 form an actuator knob 205.

The assembly and operation of the invention of the co-pending application will now be described.

The mounting plate 34 is secured to a suitable support surface by screws or the like. The mounting bracket 40 is then slidably mounted on the plate 34 and held in position thereon by the screws extending into the brackets B1 and B2 to clamp the same onto rails 36 and 38. If not already done so, the tubular portion 178 of bowl 172 is inserted downwardly into the central opening 190 of knob 188 so that slots 184 therein receive the spokes 191. The lower end of actuator rod 194 is inserted downwardly through bowl 172 into actuator rod support 192 with the screw or bolt 195 preventing inadvertent separation thereof. The bowl 172, actuator knob 205 and actuator rod 194 are moved upwardly with respect to accumulator 120 so that actuator rod 194 is received by hub H in spokes 138 of accumulator 120 and is received by opening 102 in spokes 100 in ring 50.

The threaded upper end portion 174 of bowl 172 is then threadably secured to threads 134 on the lower end of accumulator 120. The upper end of accumulator 120 is inserted upwards through opening 44 in shelf member 42 until shoulder 132 engages the underside of shelf member 42 which limits the upward movement of accumulator 20 with respect to shelf member 42.

The mounting ring 50 is then positioned on the upper end of accumulator 120 which protrudes above shelf member 42. Screws 88 are then inserted downwardly through openings 70, 72, 74 and 76 and are threadably secured to the upper ends of tubes 158, 160, 164 and 168 to secure mounting ring 50 to the upper end of accumulator 120 and to limit the downward movement of accumulator 120 by means of the flange 56 extending outwardly beyond opening 44 in shelf member 42. The posts 58 and 60 are received by the openings 46 and 48 of shelf member 42 to limit the rotational movement of the accumulator 120 and attached components relative to the shelf member 42.

Cap 104 is then secured to the open upper end of mounting ring 50 by the screws 109 extending downwardly through the screw holes 108 and being threadably received by the posts 86 in channel 66 of mounting ring 50. The assembly is now ready for use.

When it is desired or dose or dispense liquids, the bottle 10 is inverted and threadably secured to the internal threads 103 in the central opening 98 of mounting ring 50. At this time, the dispensing knob 205 and the actuator rod 194 secured thereto will be in the lowermost position (FIG. 6) so that the upper end of actuator rod 194 will not cause the valve 24 to open at this time. At this time, valve 24 is closed, valve 196 is open and valve 198 is closed. There will be air in the channel 118 which is formed by the mating of the channel 68 in mounting ring 50 and the channel 116 in cap 104. There will also be air in the accumulator 120 and in the dispensing bowl 172.

To begin the dispensing operation, the dispensing knob 205 is moved from its lower position (FIG. 6) to its upper position (FIG. 7) which causes the upper end of actuating rod 194 to open valve 24. At this time, valve 196 will be closed and valve 198 will be open. During the upward movement of the knob 205 and actuator rod 194 from its lower position to its upper position, valve 196 will be closed prior to valve 198 being opened. As liquid drains into the accumulator 120 from the bottle 10 through the valve 24, the air in the accumulator 120 will go through the liquid flowing from the bottle 10 into the bottle 10 to replace the liquid draining therefrom to prevent an airlock. The air in the accumulator 120 will also flow upwardly into the channel 118 through the two vent openings 80 and 84. Excess air in the channel 118 will flow downwardly through vent openings 78 and 82 through the vent tubes 162 and 164 into the open bowl 172.

When the accumulator 120 has been filled with liquid and it is desired to dispense the same into the bowl 172, the knob 205 is moved to its lower position which causes valve 24 to close, valve 196 to open and valve 198 to be closed. As the liquid flows from the accumulator 120 into the bowl 172, the air in bowl 172 passes upwardly into channel 118 through the two vent tubes 162 and 164. The air in the channel 118 flows through the two vent holes 80 and 84 into the interior of the accumulator 120 to replace the liquid draining from the accumulator 120 into the bowl 172.

When it is desired to dispense or dose the liquid from the bowl 172, the dispensing knob 205 is moved upwardly which causes valve 24 to open, valve 196 to close, and valve 198 to open. As liquid drains from the bowl 172, the liquid volume therein is replaced with air from the bottom of the two vent tubes 162 and 164 with air from the channel 118 flowing downwardly through the vent tubes. The air from the accumulator interior compartment flows into the bottle through 24 and also into channel 118 by way of the vent openings 80 and 84 between the channel 118 and the accumulator interior compartment. As this is happening, liquid flows from the bottle 10 downwardly into the accumulator 120 so that the cycle may begin again.

Figure 12:
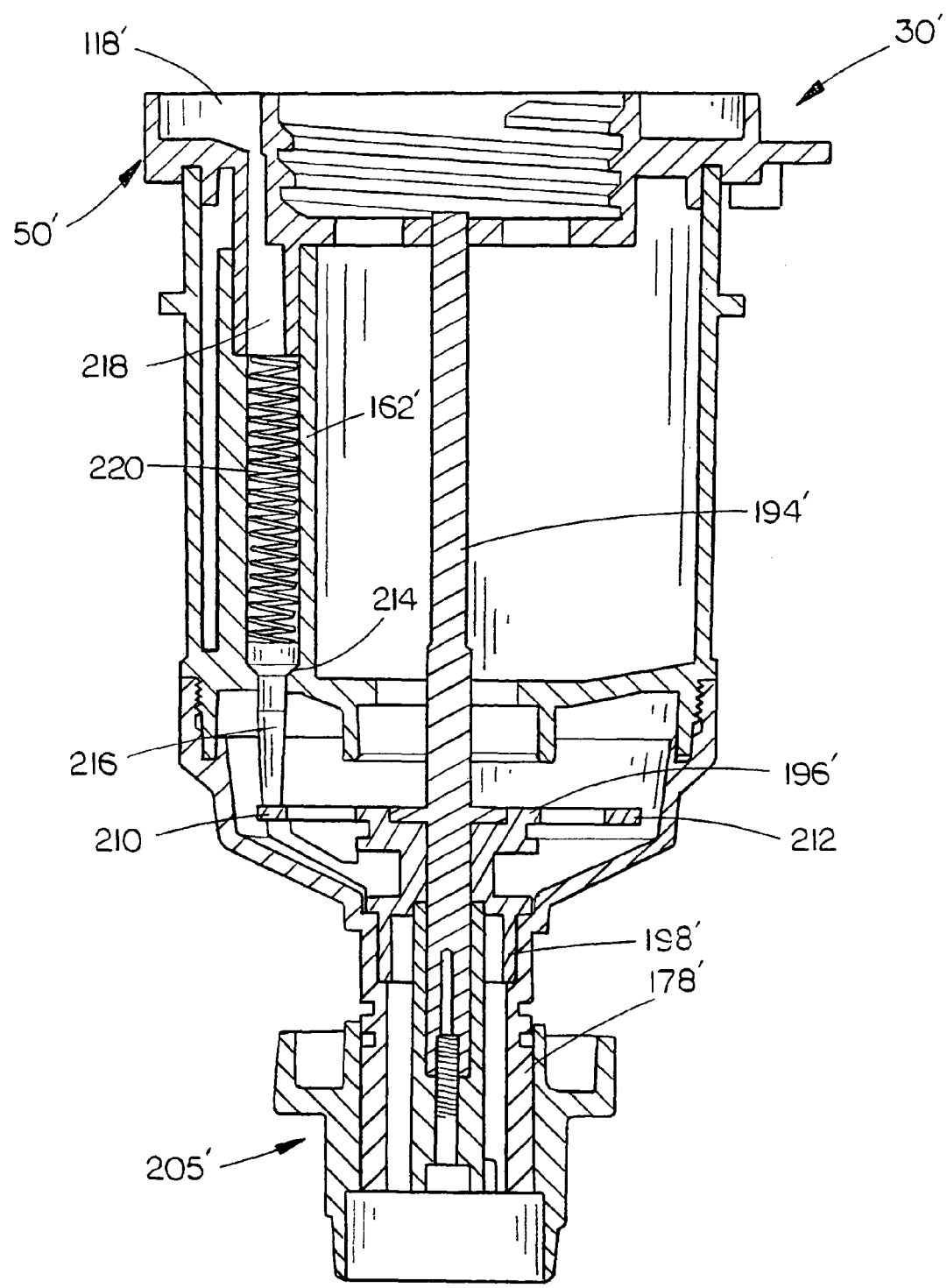
FIG. 12 is a vertical sectional view of a modified form of the invention in its non-dispensing position.
Figure 13:
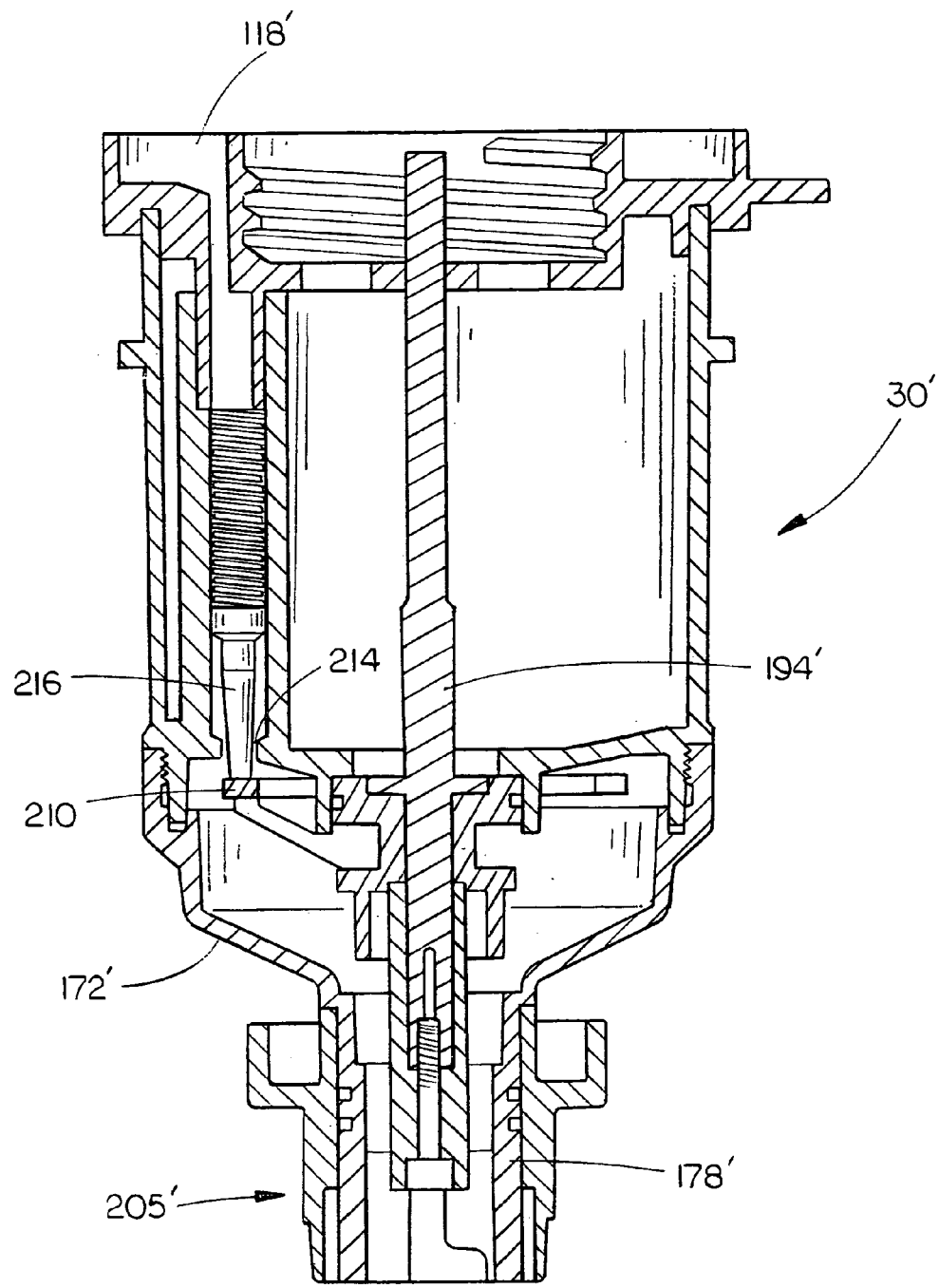
FIG. 13 is a vertical sectional view of the embodiment of FIG. 8 in its dispensing and dosing position.

A modified form of the system is illustrated in FIGS. 11 and 12. The primary differences will now be described with the reference numeral 30' referring to the modified embodiment. In system 30' the tubular portion 178' is somewhat longer than the tubular portion 178 in system 30. The actuator knob 205' in system 30' is shaped somewhat differently than the knob 205 in system 30 and the sleeve 202 is omitted from system 30'. The actuator rod 194' is secured to the actuator rod support 192' which is secured to the actuator 205'. Another difference is that the valve 196' has a pair of wings 210 and 212 extending laterally therefrom.

The vent tubes 162 and 168 in system 30 are modified in system 30' so that the venting therethrough is controlled by a poppet valve as will now be described. Since only tube 162' is shown in FIGS. 11 and 12, only tube 162' and associated structure will be described. The lower end of tube 162' has a valve seat 214 formed therein which may be closed by a poppet valve 216 which is movably mounted in tube 162'. Mounting ring 50' has a short tube 218 extending downward from channel 118' and which is received in the upper end of tube 162'. Spring 220 is positioned in tube 162' between the lower end of tube 218 and the upper end of poppet valve 216 to normally close valve seat 214. The lower end of poppet valve 216 is in engagement with the upper end of wing 210.

FIG. 11 illustrates valve 198' open, valve 196' closed and valve seat 214 closed. When the actuator rod 194' is moved from its lower position of FIG. 8 to its upper position of FIG. 12, valve 196' moves upwardly which causes wing 210 to move poppet valve 216 upwardly to open valve seat 214 so that venting air may move upwardly from the interior of bowl 172' to channel 118' and vice versa. Other than the use of the poppet valve in system 30', the operation of system 30' is the same as described with respect to system 30.

Thus, it can be seen that a unique venting system as described in the co-pending application has been provided for a dosing and/or dispensing system which ensures that airlocks in the system will be prevented and which permits the efficient and accurate dispensing or dosing of liquid therefrom.

Figure 14:
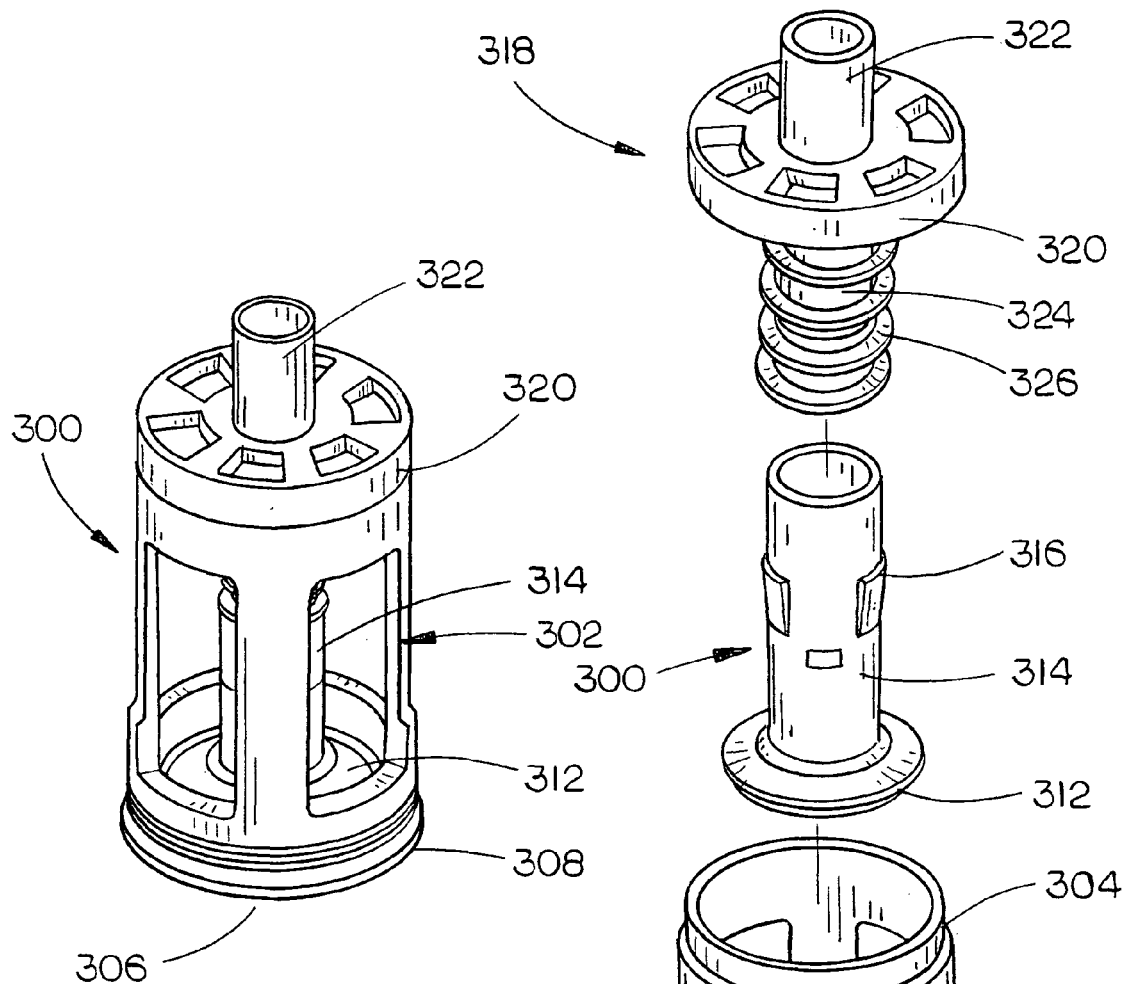
FIG. 14 is a perspective view of the improved throat plug assembly of this invention.
Figure 15:
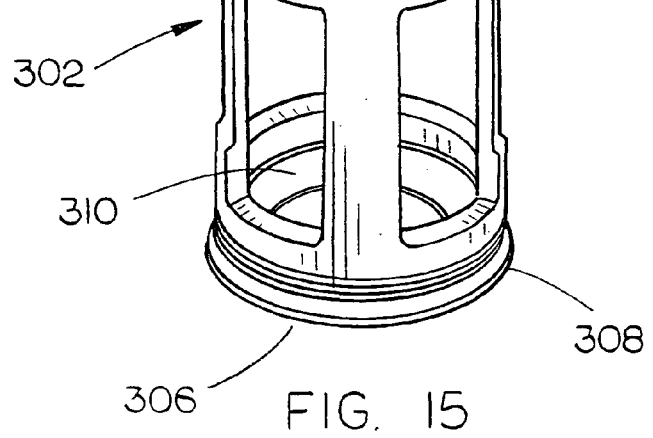
FIG. 15 is an exploded perspective view of the throat plug assembly of FIG. 14.

With respect to the improved throat plug assembly of this invention, as seen in FIGS. 14 and 15, the improved throat plug 300 is intended to replace the throat plug 16 of the co-pending application. The throat plug assembly 300 is inserted into the hollow throat portion of the bottle or container 10 when the bottle 10 is in its upright position. Throat plug assembly 300 will be described as being in position in the inverted bottle and as having a cylindrical body portion 302 with a reduced diameter upper end 304 and a lower end 306, having a protruding rim or flange 308. The throat plug assembly 300 includes a valve seat 310, which is adapted to receive a valve 312 provided on valve stem 314. Valve stem 314 has a plurality of radially spaced-apart shoulders 316 formed therein intermediate its ends.

The numeral 318 refers to a retainer/spring assembly which is adapted to be snap-fitted onto the upper end 304 of body portion 302. Retainer/spring assembly 318 includes a cap or retainer 320 having a tube 322 extending upwardly therefrom and a tube 324 extending downwardly therefrom. Retainer 320 is secured to the upper end 304 of body portion 302. In the preferred embodiment, spring 326 is integrally molded with retainer 320 with the upper end thereof embracing tube 324 and with its lower end embracing valve stem 314. The lower end of spring 326 engages shoulders 316. Spring 326 yieldably urges valve 312 to its closed position in valve seat 310.

The entire throat assembly 300 is comprised of a recyclable plastic material. The fact that the spring 326 is plastic rather than metal as in Applicant's previous designs enables the entire throat assembly to be recycled without the necessity of removing a metal spring therefrom which is time consuming. Further, the fact that the retainer 320 and spring 326 are preferably of one-piece molded construction eliminates one part thereby enhancing the assembly of the throat plug assembly.

Thus, it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination:
an inverted liquid container having upper and lower ends;
said lower end of said container having a hollow throat extending downwardly therefrom which has interior and exterior surfaces;
said exterior surface of said throat being threaded;
a throat plug assembly having upper and lower ends, positioned in said throat of said container and closing the same;
said throat plug assembly being comprised of a recyclable plastic material;
said throat plug assembly including a first valve seat;
said throat plug assembly including a normally closed, vertically movable first valve therein which is movable between a lower closed position with respect to said first valve seat to an upper open position;
said throat plug assembly including a plastic spring which yieldably urges said first valve into its said closed position;
said first valve in said throat plug assembly preventing liquid from passing downwardly from said container through said first valve seat in said throat plug assembly when in its said lower closed position;
said first valve in said throat plus assembly permitting liquid to pass downwardly from said container through said first valve seat in said throat plug assembly when in its said upper open position;
a mounting ring member having upper and lower ends;
said mounting ring member having first and second upstanding, ring-shaped walls, having inner and outer faces, formed therein which have upper and lower ends and which have a bottom wall extending therebetween at the lower ends thereof to define a first channel;
said bottom wall of said mounting ring member having a plurality of openings formed therein;
said inner face of said first wall of said mounting ring member having threads thereon adapted to threadably receive said throat of said container;
said mounting ring member having a central opening formed therein inwardly of said inner face of said first wall thereof;
a ring-shaped cap positioned on said mounting ring member extending over said upper ends of said first and second walls of said mounting ring member to close the upper end of said first channel;
said ring-shaped cap having a central opening which registers with said central opening in said mounting ring member;
a hollow, generally cylindrical-shaped accumulator having an open upper end, a bottom wall, and a liquid compartment therein;
said bottom wall of said accumulator having a central opening formed therein which has an annular second valve seat positioned outwardly thereof which extends therearound and downwardly therefrom;
said bottom wall of said accumulator having a plurality of openings formed therein outwardly of said second valve seat;
at least some of said openings in said bottom wall of said accumulator having a hollow vent tube, having upper and lower ends, in communication therewith which extends upwardly within said liquid compartment thereof;
said upper ends of said vent tubes being in communication with at least some of said openings in said bottom wall of said first channel of said mounting ring member;
a dosing bowl having upper and lower ends and a dosing compartment formed therein;
said upper end of said dosing bowl being secured to said accumulator at the lower end thereof so that said dosing compartment is in communication with said central opening in said accumulator and with said openings in said bottom wall of said accumulator;
said lower end of said dosing bowl having a discharge opening and a third valve seat extending therearound;
a dispensing knob selectively vertically movably mounted on said lower end of said dosing bowl which is movable between upper and lower positions with respect thereto;
said knob having an actuator rod, having upper and lower ends, operatively secured thereto for movement therewith, movable between upper and lower positions, which extends upwardly therefrom through said dosing bowl, said central opening in said bottom wall of said accumulator, and said central opening in said mounting ring member for selective engagement with said first valve in said throat plug assembly;
said actuator rod causing said first valve to open when said actuator is in its said upper position;
said actuator rod having second and third vertically spaced valves mounted thereon for movement therewith;
said second valve closing said second valve seat when said actuator is in its said upper position and opening said second valve seat when said actuator is in its said lower position;
said third valve closing said third valve seat when said actuator is in its said lower position and opening said third valve seat when said actuator is in its said upper position;
said first and second valves being vertically spaced on said actuator rod so that said second valve seat is closed before said third valve seat is opened as said actuator rod is moved from its said lower position to its said upper position and so that said third valve seat is closed before said second valve seat is opened as said actuator rod is moved from its said upper position to its said lower position.

2. The combination of claim 1 wherein at least one of said vent tubes has a normally closed poppet valve positioned therein which is movable from a normally closed lower position to an open upper position, and wherein said second valve is in operative engagement with said poppet valve to move said poppet valve from its said closed lower position to its said open upper position as the second actuator rod is moved from its lower position to its upper position.

3. The combination of claim 2 further including a spring in said vent tube which yieldably urges said poppet valve to its said closed lower position.

4. The combination of claim 1 wherein said throat plug assembly includes a body portion having a plastic retainer secured thereto and wherein said plastic retainer and said plastic spring are integrally molded as a one-piece part.

* * * * *